Dec. 19, 1961            I. L. GROH            3,013,836

EXPANDING CAMPING TRAILER

Filed Nov. 27, 1957            3 Sheets-Sheet 1

INVENTOR
Irvin L. Groh

Dec. 19, 1961  I. L. GROH  3,013,836
EXPANDING CAMPING TRAILER
Filed Nov. 27, 1957  3 Sheets-Sheet 3

INVENTOR
Irvin L Groh

United States Patent Office 3,013,836
Patented Dec. 19, 1961

3,013,836
EXPANDING CAMPING TRAILER
Irvin L. Groh, Owosso, Mich.
(2895 Meadowbrook Blvd., Cleveland Heights, Ohio)
Filed Nov. 27, 1957, Ser. No. 699,218
4 Claims. (Cl. 296—23)

This invention relates to collapsible and expansible structures and more particularly to vehicles incorporating such structure and more commonly referred to as camp trailers.

The desirable form of camp trailer should be small and compact when towed by a vehicle such as an automobile so that the driver's rearward field of vision is not obstructed and so that crosswinds which cause conventional house trailers to rock and swerve, will not have an adverse effect. On the other hand, when the trailer is parked and expanded or unfolded for use, it should be large and spacious to offer both sleeping facilities and adequate space for cooking and dining. Furthermore, the transition between transport or folded position and expanded or unfolded positions should be accomplished speedily, with a minimum of effort. This is of particular importance in rainy weather when the desired operation should be accomplished by one person with a minimum of exposure to the rain. Naturally, to be popular with campers, these results should be obtained at a low cost and consequently a simple structure is required.

It is a general object of this invention to provide an expanding camp structure which accomplishes the above enumerated desirable features.

A further object of the invention is to provide an expanding structure which can be expanded both horizontally and vertically to afford spacious living and storage accommodations.

Another object of the invention is to provide an expanding structure which will expand vertically in response to expansion in a horizontal direction.

Still another object of the invention is to provide a camp trailer structure in which bed units are movable horizontally to expand and collapse the structure and in which such movement is effective to raise and lower a roof structure.

A more specific object of the invention is to provide an expanding camp trailer in which bed units may be moved horizontally to expand the trailer and in which a lift mechanism associated with the beds is effective to raise a roof structure.

The foregoing and other objects and advantages are attained by the present invention, various novel features of which will be apparent from the following description and from the accompanying drawings disclosing a preferred embodiment of the invention.

Referring to the drawings.

Figure 1:
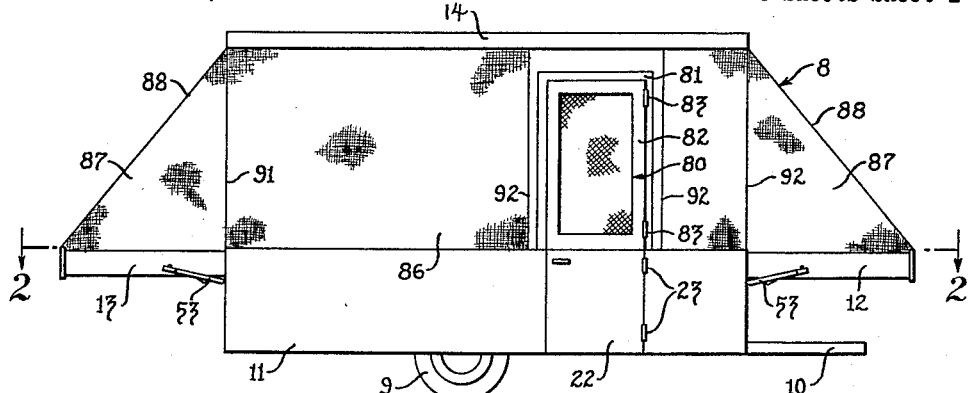
FIG. 1 is a side elevation of a trailer embodying the invention shown in its expanded condition.

Referring to the drawings, a preferred form of the invention is embodied in a trailer having a pair of wheels 9 supported in any conventional manner from a frame, the forward end of which forms a tongue 10 which may be provided with a coupling for connection to a hitch on an automobile.

Figure 3:
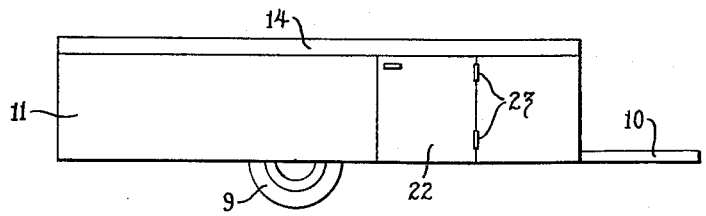
FIG. 3 is a side elevation similar to FIG. 1 but showing the trailer in its collapsed position.

The principal components of the structure are a body structure or box 11, a pair of auxiliary body members in the form of beds 12 and 13 which are supported within the box 11 for movement to positions projecting from the box as shown in FIG. 1, and a cover or roof 14 which closes the top of the box 11 when the trailer is folded as shown in FIG. 3 and forms a roof portion when the trailer is expanded as shown in FIG. 1.

Figure 2:
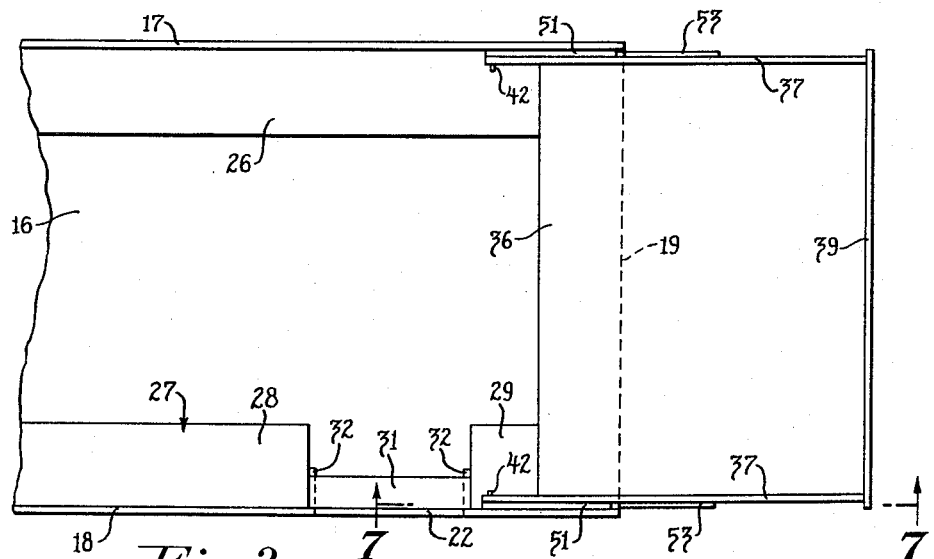
FIG. 2 is an enlarged top view of a forward part of the trailer with the upper portion removed as seen from the line 2—2 in FIG. 1.

The box or body unit 11 is secured to the trailer frame and includes a floor 16, side walls 17 and 18 and end walls 19 and 20 (FIG. 4), all of which can be fabricated of wood or metal,. The side wall 17 is continuous while the side wall 18 is provided with a door 22 hinged as at 23 to give access to the box 11. Opposite sides of the box are provided with parallel, horizontally extending shelves 26 and 27 which may be used for seats when the trailer is expanded and occupied. The spaces under the seats form housings for the wheels 9 and the remaining portions afford storage. As shown in FIG. 2, the seat 26 is unbroken and extends from one end of the body unit to the other while the seat 27 at the opposite side of the body unit 11 is broken into seat portions 28 and 29 disposed at opposite sides of the door 22. A bridge member 31 is removably supported on brackets 32 fastened to the ends of the seat portions 28 and 29 to form a continuous shelf extending between the ends of the trailer for a purpose to be described later.

The auxiliary body members 12 and 13 disposed at opposite ends of the trailer are identical and each includes a bottom portion 36, a pair of side rails 37, and a wall 39 rigidly joined together to form a scoop-like structure disposed between the side walls 17 and 18 of the body unit 11. The beds are constructed of a size large enough to receive conventional mattresses so that the pair of rails 37 of each bed form the head and foot of the bed, respectively. The walls 39 form an outer side of each bed and in the folded condition of the trailer shown in FIG. 6 act with the end walls 19 and 20 to enclose the ends of the box 11.

Figure 6:
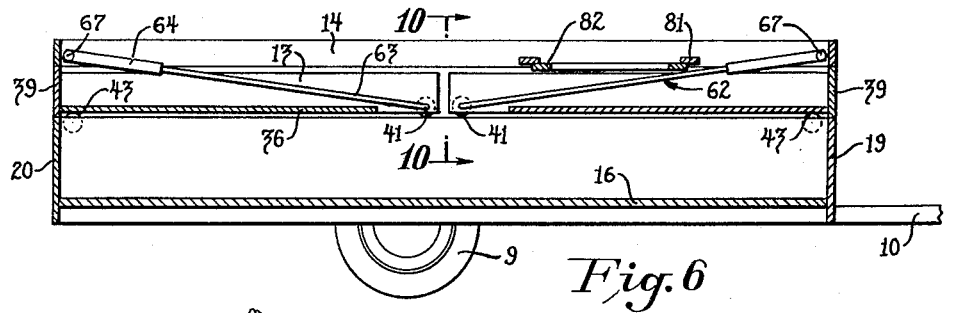
FIG. 6 is a cross-section taken longitudinally of the trailer in its collapsed condition.
Figure 7:
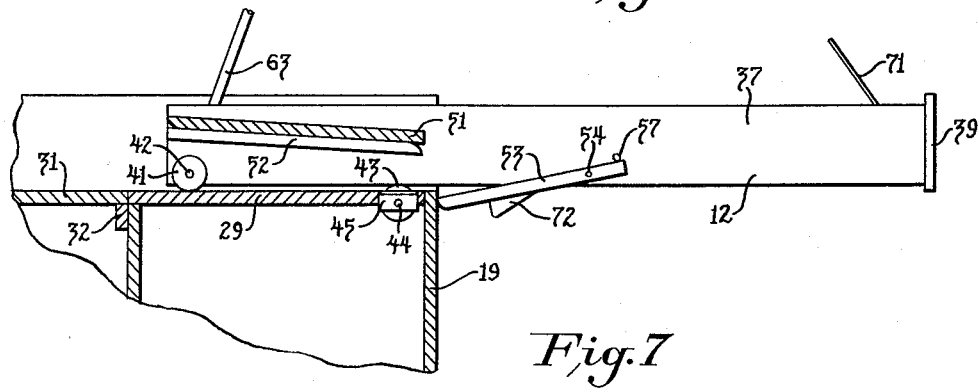
FIG. 7 is a fragmentary sectional view taken on line 7—7 in FIG. 2, but at an enlarged scale.
Figure 10:
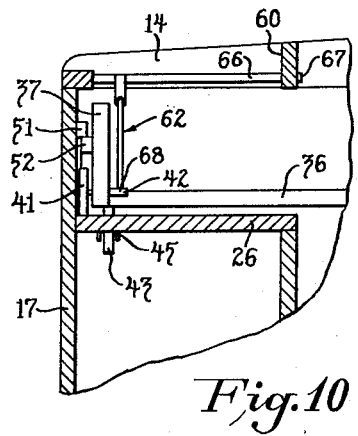
FIG. 10 is a fragmentary sectional view taken on line 10—10 in FIG. 6, but at an enlarged scale.

Both the bed 12 and the bed 13 are supported within the body unit in the same manner by identical roller means adjacent opposite sides of the trailer. As seen in FIGS. 7 and 10 the roller means associated with the bed 12 and the body side 17 includes a roller 41 rotatably mounted on an axle 42 secured to the bed rail 37 and a roller 43 mounted on the seat 26 to project above its upper surface by means of an axle 44 supported relative to the seat by brackets 45. The roller 41 has rolling contact with the top of seat 26 and roller 43 has rolling engagement with the underside of bed bottom 36 so that the rollers 41 and 43 move toward each other when the beds are moved from a collapsed position as shown in FIG. 6 to an expanded position as shown in FIG. 7. Another set of rollers 41 and 43 is associated with the bed 12 and the seat 27 at the opposite side of the trailer. Identical sets of roller means are associated in the same manner with the bed 13 and the seats 26 and 27 at the other end of the body unit so that the beds 12 and 13 may be moved generally horizontally and independently of each other with a minimum of resistance.

In the extended position of the beds as shown in FIG. 1, the weight of the overhanging portion of the beds is resisted by a mechanism associated with each side rail 37 and best seen in FIG. 7. An elongated stop element 51 is rigidly fastened to the side wall 17 in a position sloping downward toward the end of the trailer. A complementary stop element 52 is secured to the bed rail 37 at the same inclination as the element 51. In the extended position of the beds, the elements 51 and 52 wedge against each other to support the beds vertically and also act as a stop to limit horizontal movement of the beds outwardly from the box. Inward movement of the beds 12 and 13 from their fully extended position shown in FIGS. 1 and 2 is prevented by lever elements 53, one of which is pivoted intermediate its ends at 54 to each side rail 37. In the collapsed or folded condition of the trailer the levers rest on the associated shelf 26 or 27, between the bed side rail 37 and the adjacent box side wall. When the beds 12 and 13 are moved toward their fully extended positions, the ends of the levers 53 slide on the surfaces of the seats 26 and 27 and when the beds reach their fully extended position, the levers at opposite sides of the bed pivot downwardly under their own weight until end portions engage associated stops 57 mounted on the bed side rails 37. In this position the other end of each lever engages the associated end wall 19 and 20 of the box to prevent inward movement of the bed. When the beds are to be moved into the box it is merely necessary to move the ends of the levers upwardly to disengage them from the box and permit them to slide on the surface of the associated seat 26 or 27 during horizontal inward movement of the bed.

The cover unit 14 which closes the top of the box 11 is preferably fabricated of sheet metal fastened to a frame 60 fabricated of wood or metal and in the transport positions of the trailer shown in FIGS. 2 and 6 rests on the body unit 11. Conventional latches or trunk locks (not shown) may be used to rigidly but detachably fasten the top to the body to hold the latter and the beds 12 and 13 in position when the structure is towed by a vehicle.

When the trailer is expanded for occupancy, the cover member 14 may be supported in raised elevation relative to the body unit by a mechanism which includes four lift struts, links or support assemblies 62, one of which is associated with each corner of the cover 14 and with each side rail 37 of the beds 12 and 13. As seen in FIGS. 6, 7 and 10, each strut includes a tubular element 63 telescoped into a tubular element 64 having a sleeve 66, FIG. 10, fixed with and at right angles to one end thereof. This sleeve receives with a smooth fit a long bolt 67 fastened at its opposite ends to spaced portions of the frame 60 to form an upper pivot for the support assembly. The elements 63 are each provided with a tubular bearing member 68 which is received by one of the axles 42 which also supports a roller 41 to form a lower pivot for the strut 62. Each element 63 is freely supported to slide in its respective tubular element 64 for a purpose to be described later. However, in the expanded condition of the trailer, each element 63 extends into element 64 for the full length of the element 64 to support the weight of the cover 14 and hold it in an elevated position above the body unit where it acts as a roof.

Figure 4:
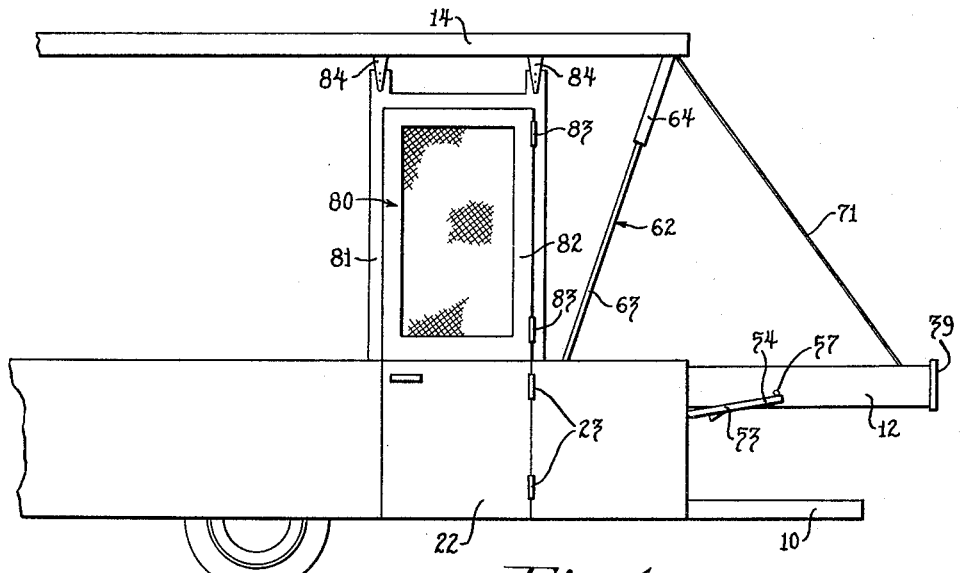
FIG. 4 is an enlarged side view of the forward part of the trailer as it appears in its expanded condition and with fabric portions removed for purposes of disclosure.
Figure 5:
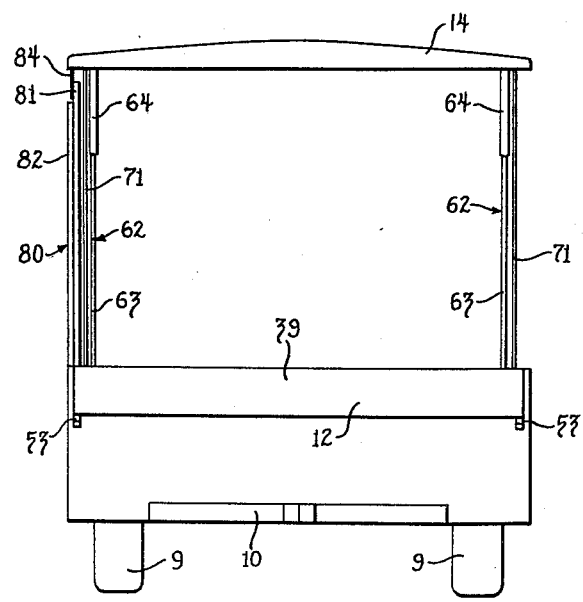
FIG. 5 is an end view of the trailer as viewed from the right in FIG. 4.

The expanded structure formed by bed units 12 and 13 projecting from the body unit 11 and the elevated cover unit 14 is braced by flexible members 71 in the form of cables, chains or the like, one of which is disposed at each of the four corners of the trailer. Preferably one end of each member is fastened to the pivot 67 at a corner of the cover and the other end is fastened to the outer corner of the associated bed as seen in FIGS. 4 and 5. In this manner the weight of the outer ends of the beds 12 and 13 act in opposition to each other through the flexible members 71 and the cover 14. Furthermore the weight of the cover 14 is transmitted to the inner ends of the beds by means of the support assemblies 62 to help support the outer ends of the beds.

In the collapsed or transport condition of the trailer as seen in FIG. 6, the beds 12 and 13 are disposed in side-by-side relation within the body unit so that the bed ends 39 enclose the ends of the body. The strut members 62 are disposed in a slightly inclined position adjacent the side rails 37 and the cover 14 rests on the side walls 17 and 18 to completely enclose the components within the body unit.

Figure 8:
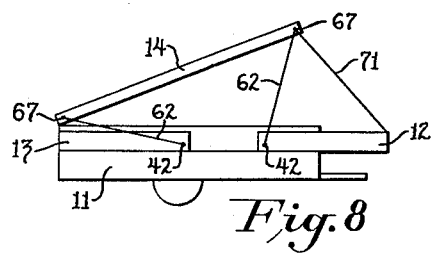
FIG. 8 is a diagrammatic view showing the relationship of the parts in a partially expanded condition of the trailer.

To expand the trailer, the bed 12 is pulled outwardly from the box 11 so that rollers 41 move horizontally toward the rollers 43. This causes the axles 42 to push on the pivot bolts 67 through the struts 62 so that the bolts 67 are guided upwardly by the cover 14 which pivots on an arc about its rearward end as seen in FIG. 8. Movement of bed 12 may be continued until the flexible members 71 become taut. Since the cover swings on an arc, the flexible members 71 become taut before the bed 12 reaches its fully extended position. At this point an auxiliary stop 72 (FIG. 7) mounted on one of the lock levers 53 will drop downwardly to engage the end wall 19 and prevent inward movement of the bed 12. In this manner the bed 12 and the cover 14 are maintained in an intermediate position between fully collapsed and expanded positions. Although each of the levers 53 may be provided with a stop 72 it has been found that only one stop is required. This should be mounted on one lever of the pair of levers 53 which is associated with the bed that will be moved first.

With the cover supported in the tilted position shown in FIG. 8, the bed 13 at the opposite end of the trailer may be moved horizontally and outwardly from the body unit 11. During such movement the ends of the levers 53 will slide along the seats 26 and 27 until the stop elements 52 on the rails 37 of the bed wedge against the stop elements 51 on the inside of the walls 17 and 18 of the body unit as seen in FIG. 7. When the bed reaches this position the levers 53 will swing downwardly about their pivots 54 until the short ends of the levers engage the stops 57 so that the end portions of the levers engage the end wall 20 to prevent inward movement of the bed. Under these conditions the bed 13 is held against horizontal movement in one direction by the stop elements 51 and 52 and in the other direction by the levers 53. The bed is also supported against vertical movement by rollers 41 by stop elements 51 and 52.

Figure 9:
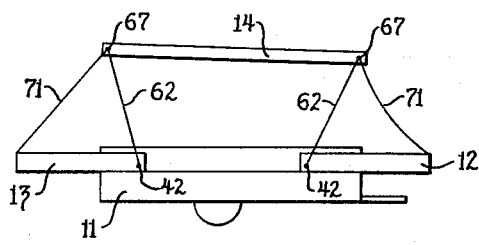
FIG. 9 is another diagrammatic view similar to FIG. 8, but illustrating another position of the parts.

During movement of bed 13 to its fully extended position, movement is transmitted from axles 42 through the associated struts 62 to the pivot bolts 67. This causes the rearward end of the cover 14 to swing upwardly on an arc about the pivot bolts 67 at the forward end of the trailer. As the bed reaches its fully extended position the flexible members 71 connected to the bed 13 becomes taut and the parts assume the position shown in FIG. 9. Since the bed 12 has not been moved to its fully extended position the forward end of the cover 14 will drop slightly and flexible member 71 will become slack. However, as the bed 12 is moved outwardly the remaining distance from the position illustrated in FIG. 9 to the position illustrated in FIGS. 1 and 4, the forward end of the cover will be raised to the same height as the rearward end of the cover, all of the members 71 will become taut, the stop members 51 and 52 will move into engagement with each other and the stop lever 53 will engage the wall 19 to prevent inward movement of the bed 12.

In this condition of the parts the beds 12 and 13 are held against both horizontal and vertical movement and the cover 14 is held by the struts 62 in an elevated position parallel to the floor of the box to act as a roof. In addition, the flexible members 71 hold the cover 14 in the desired position directly over the box and help suspend the weight of the outer ends of the beds 12 and 13 so that additional jacks or supports are not required.

To collapse the structure from the position shown in FIGS. 1 and 4 to the position in FIGS. 3 and 6, the stop levers 53 on bed 12 are pivoted upwardly out of engagement with the end wall 19 and the bed 12 is permitted to move into the body 11 until stop element 72 on one of the levers 53 engages the end wall 19. The various parts will then be in the condition illustrated in FIG. 9. Subsequently the levers 53 on the bed 13 are pivoted upwardly out of engagement with wall 20 and the bed is permitted to move to its position within the box. This permits the rearward end of the cover 14 to drop into engagement with the body unit 11 as shown in FIG. 8. Thereafter the stop element 53 is moved out of engagement with wall 19 and bed 12 is permitted to move the remainder of the distance into the body unit 11 so that the cover 14 encloses the body 11 and the parts are in their fully collapsed position as shown in FIGS. 3 and 6.

It will be noted that during the expanding operation the telescoped strut elements 63 and 64 act as a one-piece link so that the force applied to the beds to move them horizontally is transmitted through the struts 62 to move the cover 14 vertically. During the collapsing operation, the weight of the cover unit maintains the elements 63 and 64 in their telescoped condition and horizontal movement of the beds inwardly of the body unit permits the cover to move downwardly in response to movement of the beds. The elements 63 and 64, therefore, act as a fixed unit during raising and lowering of the cover 14 in response to movement of the beds 12 and 13. However, the elements 63 are free to slide within the elements 64 which makes it possible to raise the cover 14 independently of the beds 13 and 14 when the latter are disposed as shown in FIG. 6. In other words, the cover 14 moves in response to movement of the beds but it also can be moved independently of the beds. This is of particular convenience for making final adjustments after the trailer has been collapsed and will be described more fully later.

Access to the structure in its expanded condition is afforded by a door assembly 80 which as shown in FIGS. 1 and 4 includes a frame structure 81 and a door 82 hinged to the frame by hinges 83. The entire assembly 80 is pivoted toward the cover 14 by hinges 84. See FIGURE 4. In the positions shown in FIGS. 1 and 4, the assembly 80 is disposed so that the hinges 83 are in vertical alignment with hinges 23 supporting the door 22. The doors 22 and 82 may be fastened together in any conventional manner or they may be permitted to open and close independently of each other to give access to the body unit 11. In the collapsed condition of the trailer as seen in FIG. 6, the assembly 80 is pivoted through hinges 84 to a generally horizontal position partially within the cavity formed by the cover and is detachably fastened to the cover 14 by any conventional means such as straps, latches or the like (not shown).

Referring again to FIG. 1, a flexible fabric such as canvas is used to form side walls and roof portions to completely enclose the structure. The fabric is fastened at its top edge to the perimeter of the expanded trailer formed by the box walls 17 and 18, side rails 37 and end walls 39 of the bed and also to the sides and top of the door frame 81. In this manner the fabric forms side walls 86 above the box 11, side walls 87 above the beds 11 and 12, and inclined roof portions 88 extending from the cover 14 to the end walls 39 of the beds. Slide fasteners 91 are disposed between the side walls 86 and 87 and are disposed to extend from the four corners of the roof 14 to the corresponding corners of the body unit 11. The fasteners make it possible to leave the fabric attached to the trailer parts and are opened to prevent the fabric from interfering with movement of the beds. In like manner, a pair of slide fasteners 92 disposed at opposite sides of the door frame may be opened to permit swinging movement of the door assembly 80.

When the trailer is collapsed to the FIG. 3 position, any fabric portions which protrude from the body unit may be tucked under the cover 14 by moving the latter upwardly relative to the stationary beds 12 and 13. As previously described, this movement is facilitated by the lost motion afforded between telescoping strut elements 63 and 64.

From the viewpoint of the camper the expanding and collapsing operations are simple and rapid. After the trailer has been disconnected from its towing vehicle and supported in a level position at the camp site the cover 14 is unlatched and bed 12 is pulled from the body unit 11 to an intermediate position (FIG. 8). Thereafter, bed 13 is pulled to its final position (FIG. 9) and bed 12 is pulled the remainder of the distance to its expanded position. At this point the camper may enter the trailer through the door 22 and be sheltered from the elements. From the interior of the trailer, the camper swings the door assembly 80 from its position against the cover 14 into the position shown in FIG. 1 and operates the slide fasteners 91 and 92 to completely enclose the structure for occupancy. Since the movement of the beds is executed in a matter of seconds, the camper is sheltered in a minimum of time. Furthermore, since the expanding and collapsing operations do not interfere with the beds, they may be kept in readiness for use as soon as the trailer is expanded. In addition, the mechanism affording the expanding and collapsing operations in no way interferes with occupancy of the body unit or the beds.

When the time comes to break camp, the slide fasteners 91 and 92 are opened, door assembly 80 is folded against cover 14, bed 12 is moved partially into body unit 11 (FIG. 9), bed 13 is moved completely into body unit 11 (FIG. 8) and bed 12 is moved the remaining distance so that cover 14 rests on and can be fastened to the body unit 11.

Not only is the trailer easily and rapidly prepared for occupancy at the camp site and for travel, but the unit is small and compact in its transport position and can be expanded to almost three times its original volume to offer a large shelter provided with two full size, double beds. Furthermore, horizontal expansion and contraction results in vertical expansion and contraction and is accomplished through simple and efficient mechanisms interposed between the beds and the cover which also forms the roof.

It should be understood that it is not intended to limit the invention to the above described forms and details, and that the invention includes such other forms and modifications as are embraced by the scope of the appended claims.

It is claimed and desired to secure by Letters Patent:

1. A vehicle unit comprising a body including a floor, and side walls fixed with and upstanding from the respective side edges of said floor, a forward bed unit, a rearward bed unit, means mounting said forward bed unit for horizontal translation between and parallel with said side walls and in a plane fixed with and above said floor, from a first collapsed position enclosed between said side walls, forwardly to a second position extended from the adjacent ends of said side walls, means mounting said rearward bed unit for horizontal translation between and parallel with said side walls and in said plane, from a first collapsed position enclosed between said side walls, rearwardly to a second position extended from the adjacent ends of said side walls, a roof movable vertically from a first position extending over said body contiguous therewith, to a second position elevated above said body, a first pair of links each pivoted at one end to a respective corner of the inner end of said forward bed unit, and pivoted at its other end to a respective corner of the corresponding end of said roof, a second pair of links each pivoted at one end to a respective corner of the inner end of said rearward bed unit, and pivoted at its other end to a respective corner of the other end of said roof, said links being inclined upwardly and outwardly at a small angle to the horizontal and operating directly to elevate said roof to second position by and in response to translation of said bed units to second positions, said bed units being translatable independently and sequentially between first and second positions.

2. A vehicle unit as in claim 1, a first pair of flexible line elements each connected at one end to a respective corner of the outer end of said first bed unit and at its other end to a respective adjacent corner of said roof at the forward end thereof, a second pair of flexible line elements each connected at one end to a respective corner of the outer end of said second bed unit and at its other end to a respective adjacent corner of said roof at the rearward end thereof, all said elements being tensioned by and in response to elevation of said roof to second position.

3. A wheeled vehicle unit comprising a body including a floor and parallel side walls fixed with and upstanding from respective longitudinal side edges of said floor, first and second bed units each comprising a pair of rigidly interconnected parallel side rails, means mounting said first bed unit for guided horizontal translation in one direction and in a horizontal plane fixed with and vertically spaced above said floor, from a first collapsed position enclosed between said side walls, to a second position extended from one end of said body, means mounting said second bed unit for guided horizontal translation in the opposite direction and in said plane, from a first collapsed position enclosed between said side walls, to a second position extended from the other end of said body, a roof superposed over said body and elevatable from a first position contiguous to and covering said body, to a second position vertically spaced above said body, a first pair of links each pivoted at one end to the inner end of a respective one of the side rails of said first bed unit and pivoted at its other end to a respective corner of a corresponding end of said roof, a second pair of links each pivoted at one end to the inner end of a respective one of the side rails of said second bed unit and pivoted at its other end to a respective corner of the other end of said roof, said links being inclined outwardly and upwardly at a small angle to the horizontal and operating directly to elevate said roof to second position by and in response to translation of said bed units to second positions, said bed units being translatable independently and sequentially between first and second positions.

4. A vehicle unit comprising a body including a floor and side walls fixed with and upstanding from and along opposite side edges of said floor, a bed unit including integrally-connected side rails, means mounting said bed unit for guided horizontal translation on said body from a first collapsed position enclosed between said side walls, to a second position extended from said body, a roof superposed over said body and elevatable relatively thereto from a first position contiguous said body, to a second position vertically spaced above said body, a pair of links each having one end pivoted to an inner end of a respective one of said side rails and its other end pivoted to a corresponding outer corner of said roof, said links elevating said roof to its said second position by and in response to translation of said bed unit from first to second position, a first elongated stop member fixed with one said side wall and inclined outwardly and downwardly at an acute angle with respect to the direction of translation of said bed unit, a second elongated stop member fixed with the corresponding side rail of said bed unit and inclined outwardly and downwardly at the same acute angle as said first stop member, said second stop member wedging beneath and in contact with said first stop member in line contact therewith when said bed unit is translated to second position.

References Cited in the file of this patent
UNITED STATES PATENTS

| | | |
|---|---|---|
| 1,216,986 | Habig | Feb. 20, 1917 |
| 1,300,021 | Richards | Apr. 8, 1919 |
| 1,696,113 | Gilkison | Dec. 18, 1928 |
| 1,864,047 | Lawhorne | June 21, 1932 |
| 2,483,332 | Brumbaugh | Sept. 27, 1949 |
| 2,837,778 | Kern | June 10, 1958 |

FOREIGN PATENTS

| | | |
|---|---|---|
| 461,624 | Great Britain | Feb. 19, 1937 |
| 590,029 | Great Britain | July 7, 1947 |